H. F. PROVANDIE.
MACHINE FOR PREPARING PAPER CUP BODIES TO RECEIVE BOTTOM PIECES.
APPLICATION FILED AUG. 30, 1913.

1,188,100. Patented June 20, 1916.

H. F. PROVANDIE.
MACHINE FOR PREPARING PAPER CUP BODIES TO RECEIVE BOTTOM PIECES.
APPLICATION FILED AUG. 30, 1913.

1,188,100.

Patented June 20, 1916.
2 SHEETS—SHEET 2.

Witnesses:
John P. Wyna
Anna L. Taylor

Inventor:
Herbert F. Provandie

UNITED STATES PATENT OFFICE.

HERBERT F. PROVANDIE, OF MELROSE, MASSACHUSETTS, ASSIGNOR TO AMERICAN WATER SUPPLY COMPANY OF NEW ENGLAND, OF BOSTON, MASSACHUSETTS, A CORPORATION OF MASSACHUSETTS.

MACHINE FOR PREPARING PAPER-CUP BODIES TO RECEIVE BOTTOM-PIECES.

1,188,100.      Specification of Letters Patent.      Patented June 20, 1916.

Application filed August 30, 1913. Serial No. 787,432.

*To all whom it may concern:*

Be it known that I, HERBERT F. PROVANDIE, a citizen of the United States, residing at Melrose, in the county of Middlesex and State of Massachusetts, have invented an Improvement in Machines for Preparing Paper-Cup Bodies to Receive Bottom-Pieces, of which the following is a specification.

This invention relates to machines for preparing paper cup-bodies in order that bottom-pieces may be readily adhesively secured thereto. The cup-bodies are of frusto-conical form and the bottom-pieces have marginal flanges, adapting them to be placed on the bodies, with their marginal flanges extended over upon the outside thereof, which flanges are adhesively secured to said bodies to secure the bottom-pieces thereto.

This invention has for its object the provision of a machine by which a line of paste or other adhesive material may be applied to the exterior of the end-portion of the body, preparatory to having the bottom-pieces placed thereon and secured thereto.

The invention comprehends the employment of a pasting-device for accomplishing this result, which may be operated by a treadle, or by other means, and a rotating cup-body form.

Figure 1:
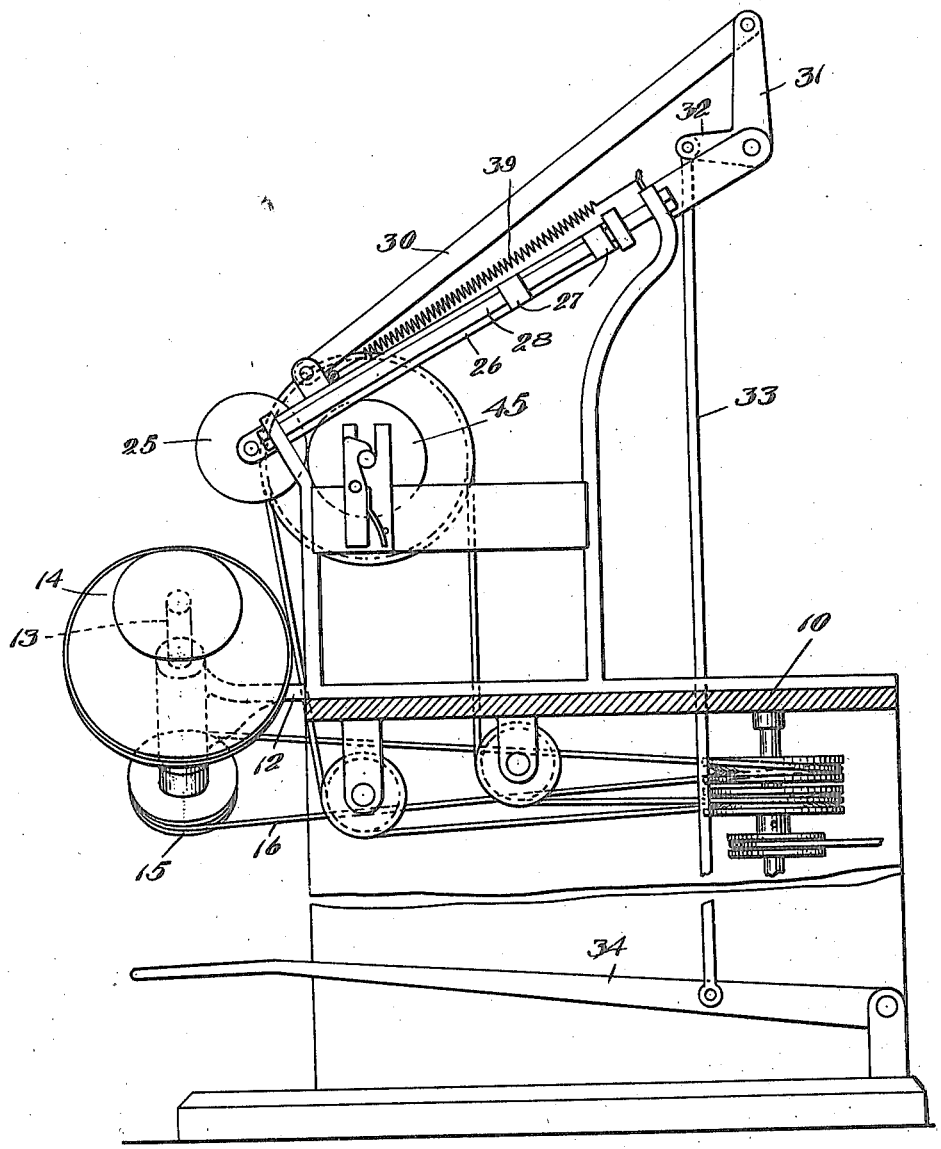
Figure 3:
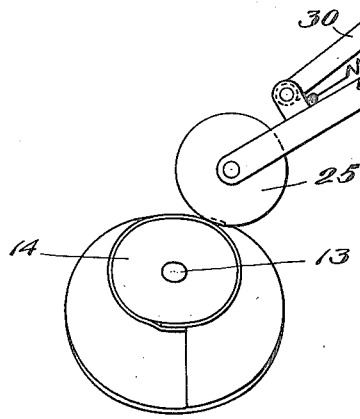
Figure 2:
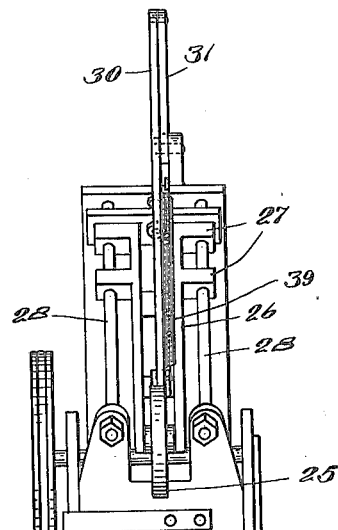
Figure 2:
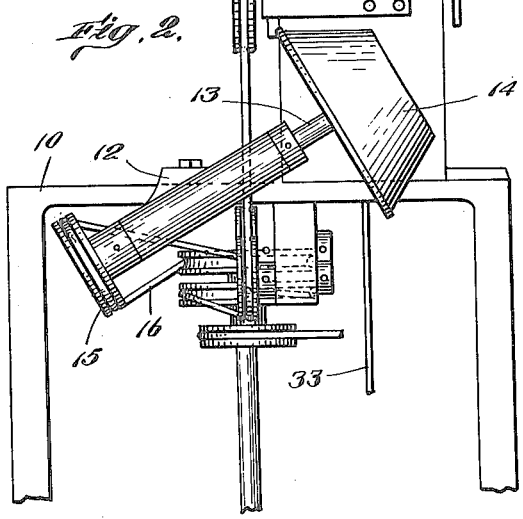
Figure 4:
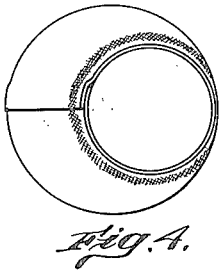

Figure 1 is a side elevation of a machine for preparing cup-body forms to receive bottom-pieces embodying this invention. Fig. 2 is a front elevation of the machine shown in Fig. 1. Fig. 3 is a detail side view of the cup-body form and pasting-roll, the latter being in engagement with a cup-body arranged on the former. Fig. 4 is a view of the cup-body having a line of paste on its lower end-portion, whereby it is prepared to receive the bottom-pieces.

10 represents the base of the machine and 12 a bracket thereon bearing an inclined shaft 13 to the upper end of which is secured a frusto-conical cup-body form 14, the inclination of said shaft being such that one side of the form occupies a horizontal position. Said shaft has secured to it a belt-pulley 15 over which a belt 16 passes for rotating the shaft and thereby rotating the cup or form. Such rotation of the form is continuous.

25 represents a pasting-roll which is rotatably supported at the forward extremity of a frame 26, which frame, as here shown, has laterally extended guiding-portions 27, 27, slidably mounted on parallel guide bars 28, 28, which provide for a reciprocating sliding movement of said frame 26 to move the pasting-roll toward and from the cup or form from the position shown in Fig. 1 to the position shown in Fig. 3. Said frame has one end of a link 30 loosely connected with it, the other end of which is loosely connected to one arm 31 of a bell-crank lever, the other arm 32 of said lever being connected with the upper end of a treadle-rod 33 which is connected with a treadle 34. Depression of the treadle acts to move the frame forward to in turn move the pasting-roll toward and into engagement with a cup-body which is placed on the form 14 and a spring 39 acts to return it to normal position. The pasting-roll is made narrow to apply a line of paste of a definite width to said roll, and as the form rotates while the pasting-roll is in engagement with the cup-body thereon a narrow line of paste is hence applied to the end-portion of said cup-body. Said line of paste is usually slightly removed from the end of the cup-body, as represented in Fig. 4. The pasting-roll, when in its normal position, as represented in Fig. 1, engages a paste-supplying roll 45 which is rotatably supported in a reservoir containing paste and which is continuously rotated by any suitable means, so far as this invention is concerned. While the pasting-roll is in engagement with the paste-supplying roll it receives a supply of paste to be subsequently applied to the cup-body when moved into engagement therewith. The operator places a cup-body on the rotating form and then depresses the treadle and operates the pasting-roll.

I claim:—

1. In a machine for preparing paper cup bodies to receive bottom pieces, a rotatable cup body form having a frusto-conical bearing surface to receive the cup, the axis of said form being at such angle to the horizontal as to maintain the uppermost longitudinal line of surface of said form in a horizontal plane in all positions of the form, a pasting roll having a paste applying surface and means for operating said roll to position the paste applying surface throughout in contact with the upper line of surface of the form.

2. In a machine for preparing cup bodies to receive bottom pieces including a frame, a shaft supported in advance of said frame and disposed at an angle to the horizontal, a frusto-conical cup body form carried by the shaft the angular disposition of the shaft disposing the upper line of surface of the form in a horizontal plane, a carrier mounted for reciprocation on the frame and at an angle to the horizontal, and a pasting roll carried movable with the carrier to present an edge surface in a horizontal plane at all times, the movement of the carrier adjusting the pasting roll to and from contact with the form.

3. In a machine for preparing cup bodies to receive bottom pieces including a frame, a shaft supported in advance of said frame and disposed at an angle to the horizontal, a frusto-conical cup body form carried by the shaft, the angular disposition of the shaft disposing the upper line of surface of the form in a horizontal plane, a carrier mounted for reciprocation on the frame and at an angle to the horizontal, and a pasting roll carried movable with the carrier to present an edge surface in a horizontal plane at all times, the movement of the carrier adjusting the pasting roll to and from contact with the form, said pasting roll remaining at all times in a position above the same.

In testimony whereof, I have signed my name to this specification, in the presence of two subscribing witnesses.

HERBERT F. PROVANDIE.

Witnesses:
 JOHN P. WYMAN,
 AMOS L. TAYLOR.